United States Patent [19]

Shimizu

[11] Patent Number: 5,503,239
[45] Date of Patent: Apr. 2, 1996

[54] VARIABLE GEAR RATIO STEERING DEVICE

[75] Inventor: Yasuo Shimizu, Saitama, Japan

[73] Assignee: Honda Giken Kogyo Kabushiki Kaisha

[21] Appl. No.: 449,170

[22] Filed: May 24, 1995

[30] Foreign Application Priority Data

May 30, 1994 [JP] Japan .................... 6-140868

[51] Int. Cl.⁶ .................................... B62D 3/12
[52] U.S. Cl. .................................... 180/79; 74/393
[58] Field of Search .................... 180/79, 79.3, 146, 180/147; 464/102, 103, 104, 105; 74/390, 395, 393, 396, 397, 398, 399

[56] References Cited

U.S. PATENT DOCUMENTS

| | | | |
|---|---|---|---|
| 5,174,407 | 12/1992 | Shimizu et al. | 180/79 X |
| 5,203,421 | 4/1993 | Ueno et al. | 180/79 X |
| 5,284,219 | 2/1994 | Shimizu et al. | 180/79 X |
| 5,386,879 | 2/1995 | Shimizu | 180/79 |

FOREIGN PATENT DOCUMENTS

| | | | |
|---|---|---|---|
| 3830654 | 11/1989 | Germany | 180/79 |
| 63-163998 | 6/1988 | Japan . | |
| 5-124534 | 5/1993 | Japan | 180/79 |

*Primary Examiner*—Kevin T. Hurley
*Attorney, Agent, or Firm*—Skjerven, Morrill, MacPherson, Franklin & Friel; Thomas S. MacDonald

[57] ABSTRACT

A first shaft and a second shaft are rotatably supported by a casing in a mutually parallel but offset manner, and an intermediate member is interposed between mutually opposing axial ends of these shafts. The intermediate member transmits torque from the first shaft to the second shaft, but the intermediate member is radially slidable relative to the first shaft and is engaged with a radially offset point of the second shaft. Because the distance between the axial center line of the first shaft and the point of engagement between the intermediate member and the second shaft changes with the angular displacement of the first shaft, a desired nonlinear property can be accomplished between the angular displacements of the first shaft and the second shaft. This property can be used for achieving a desired variable gear ratio suitable for the steering device. Further, the mutual sliding movement between the first shaft and the intermediate shaft in the radial direction accommodates such a relationship, and it can be achieved in a dimensionally accurate and play free manner because the movements of the moveable members strictly consist of rotational movements of circular members and simple linear movements. Roller bearings and ball bearings should be used in various parts to minimize plays.

7 Claims, 8 Drawing Sheets

VARIABLE GEAR RATIO STEERING DEVICE

CROSS REFERENCE TO RELATED APPLICATIONS

The following copending U.S. patent applications are directed to similar subject matters as the present application, and the contents of these copending patent applications are hereby incorporated in the present application by references.

| Filing Date | Application Number |
| --- | --- |
| 1995/01/27 | 08/379,988 |
| 1994/02/07 | 08/192,577, now U.S. Pat. No. 5,386,879 |
| 1994/02/04 | 08/191,659 |

TECHNICAL FIELD

The present invention relates to a variable gear ratio steering device for a vehicle which can vary the ratio of the steered angle of the steerable road wheels to the steering angle of the steering wheel or the steering angle ratio in dependence on the magnitude of the steering input.

BACKGROUND OF THE INVENTION

Automotive steering devices typically consist of a rack and pinion mechanism as illustrated in FIG. 6. As well known in the art, a steering wheel 1 is securely attached to an upper end of a steering shaft 2, and a lower end of the steering shaft 2 is connected to a coupling shaft 4 via a pair of universal joints 3. A pinion 5 is securely attached to a lower end of the coupling shaft 4, and meshes with a rack 6 which is connected to road wheels 9 via tie rods 7 and knuckle arms 8 as well known in the art. Thus, the rotational movement ($\beta$) of the pinion 5 is converted into a linear movement (L) of the rack 6 meshing with the pinion 5, which is in turn converted into a steering movement (T) of the road wheels 9 via the tie rods 7 and the knuckle arms 8.

According to such conventional steering devices, the steering angle (T) of the road wheels 9 changes substantially linearly with the rotational angle ($\alpha$) of the steering wheel 1. However, in view of the handling of the vehicle, the rotational angle of the steering wheel 1 for achieving a maximum steering angle of the road wheels 9 is desired to be fairly small. More specifically, if the relationship between the rotational angle of the steering wheel and the steering angle of the road wheels is determined as indicated by a chain dot line (v) of FIG. 7, the necessary rotational angle of the steering wheel 1 is reduced, and a favorable vehicle handling can be achieved in a low speed range, but the vehicle response (yaw rate, lateral acceleration and rolling movement) may become so excessive in a high speed range that the vehicle handling in the high speed range may not be acceptable. It means that any fixed linear relationship between the rotational angle of the steering wheel and the steering angle of the road wheels cannot be satisfactory in all speed ranges.

Based on these considerations, the relationship between the rotational angle of the steering wheel and the steering angle of the road wheels is normally determined according to the compromise between the desired vehicle responses in both high and low speed ranges, and is typically determined in such a manner that a maximum steering angle can be achieved by turning the steering wheel 1.5 turns or 540 degrees from a neutral position in either direction as indicated by the double chain dot line (w) in the graph of FIG. 7.

The graph of FIG. 8 conceptually shows the changes in the maximum practical steering angle with the vehicle speed. The fine double chain dot line (x) indicates the maximum practical steering angle for the conventional steering system. When the vehicle speed is extremely low, the steering wheel can be turned by up to 1.5 turns. However, in a high vehicle speed range, the rotational angle of the steering angle must be kept extremely small in order to operate the vehicle in a stable fashion. Ideally, it is desired to reduce the maximum practical steering wheel angle to a lower level in a low speed range, and to increase it in a high speed range as indicated by the bold curve (y) in FIG. 8. This can be accomplished by reducing the gear ratio between the steering wheel and the road wheels ($\alpha/\beta$) in the low speed range and increasing it in the high speed range.

The variable steering angle ratio steering system proposed in copending U.S. patent application Ser. No. 08/192,577 filed Feb. 7, 1994 now U.S. Pat. No. 5,386,899 was intended to achieve such a goal. As illustrated in FIG. 11 of this application, the system proposed in the copending patent application comprises an input shaft 101 connected to the steering wheel, and rotatably supported by a substantially cylindrical support member 103, via a dual radial bearing 102, which is in turn slidably supported by a casing 106 via support pins 104 and 105 integrally provided in the support member 103. An eccentric shaft 108 which is integrally provided in an output shaft 107 is coupled to the input shaft 101 via a slide coupling 109. The output shaft 107 is coupled to a pinion 5 which in turn meshes with a rack 6 for transmitting a steering torque to the road wheels. According to this steering system, by moving the support member 103 perpendicularly to the input shaft 101 and changing the eccentricity between the input shaft 101 and the output shaft 107, the steering angle ratio can be changed in a continuous manner.

According to this structure, however, if the mechanical rigidity of the power transmitting members of the steering system is not sufficient and/or the fabrication precision is not sufficient, the steering angle ratio may be affected by the magnitude of the steering load, and an unacceptable play may be created in the steering system. Also, the process of varying the steering gear ratio may not be smoothly carried out if the fabrication precision is not fairly high.

In particular, because this previously proposed variable steering ratio steering system involves a relatively low steering gear ratio as opposed to the conventional steering system based on the compromise between the requirements of both high and low speed ranges, it is necessary to increase the rigidity and make the gear ratio varying mechanism operate all the more smoothly. However, because the support pins 104 and 105 are slidably engaged by the casing 106, it is difficult to ensure a sufficient dimensional precision, to achieve a high supporting rigidity and to allow the gear ratio varying mechanism to operate smoothly.

Another variable ratio steering system is proposed in copending U.S. patent application Ser. No. 08/191,659 filed Feb. 4, 1994. The contents of these copending patent applications are incorporated herein by reference.

Japanese patent laid open publication (kokai) No. 2-14971 discloses a steering device using a pair of elliptic gears and another pair of circular gears between the input shaft and the output shaft so that the gear ratio may be reduced as the steering input is increased. As a result, the angular displacement of the pinion is relatively small for a given increment of the steering input when the steering input is small, but the angular displacement of the pinion becomes larger for the same increment of the steering input when the steering input is large. Thus, it is possible to achieve a steering property as indicated by the curve (y) in FIG. 8, and the handling of the vehicle steering device remains substantially uniform over the entire speed range of the vehicle.

However, machining elliptic gears requires a special tool arrangement, and achieving a necessary precision is relatively difficult to accomplish. Also, the vehicle operator may experience some fluctuations in the effort required to turn the steering wheel, and may receive an unfavorable impression. Also, the speed reducing property of the gear mechanism of the steering device is determined by the shape of the elliptic gears, and cannot be changed in any simple manner. Accurately meshing the four gears with each other is essential for a favorable handling of the steering device, but it requires some special care. Removal of backlashes from the gear train including both elliptic gears and circular gears is difficult, and some play is inevitable in the gear train of the steering device from a practical view point.

BRIEF SUMMARY OF THE INVENTION

In view of such problems of the prior art, a primary object of the present invention is to provide a variable gear ratio steering device which allows the steerable road wheels to be turned by a greater angle for a given increment of the steering input as the steering input increases by using a simple structure.

A second object of the present invention is to provide a variable gear ratio steering device which is relatively free from plays.

A third object of the present invention is to provide a variable gear ratio steering device which can ensure a sufficient rigidity in the torque transmitting path of the steering device.

According to the present invention, such objects can be accomplished by providing a variable gear ratio steering device for a motor vehicle, comprising: a housing; a first shaft supported by the housing so as to be rotatable around an axial center line of the first shaft, the first shaft having an inner axial end; a second shaft supported by the housing so as to be rotatable around an axial center line of the second shaft which extends in parallel with the axial center line of the first shaft but offset from the axial center line of the first shaft, the second shaft having an inner axial end opposing the axial inner end of the first shaft; and an intermediate member engaged with the inner axial end of the first shaft so as to be integrally rotatable but slidable along a radial direction, and engaged with the axial inner end of the second shaft at a point offset from an axial center line of the second shaft in a torque transmitting relationship; one of the first and second shafts being functionally connected to a steering wheel while the other of the first and second shafts is functionally connected to a steerable road wheel.

Because the first shaft is offset from the second shaft, the distance between the axial center line of the first shaft and the point of engagement between the intermediate member and the second shaft changes with the angular displacement of the first shaft, a desired nonlinear property can be accomplished between the angular displacements of the first shaft and the second shaft. Further, the mutual sliding movement between the first shaft and the intermediate shaft in the radial direction accommodates such a relationship, and it can be achieved in a dimensionally accurate and play free manner because the movements of the moveable members strictly consist of rotational movements of circular members and simple linear movements.

According to a preferred embodiment of the present invention, one of the opposing axial ends of the first shaft and the intermediate member is provided with a ridge, and the other of the opposing axial ends of the first shaft and the intermediate member is provided with a complementary slot for receiving the ridge, a pair of slide bearings being interposed between opposing side walls of the ridge and the slot. Preferably, the slide bearings consist of roller bearings. This allows a highly play free engagement between the first shaft and the intermediate member with a minimum amount of friction.

Alternatively, the opposing axial ends of the first shaft and the intermediate member may be provided with mutually opposing radial grooves, and a slide bearing may be received in the grooves so as to allow transmission of torque between the first shaft and the intermediate member while allowing free linear movement along a radial direction. The slide bearing may consist of a plurality of rollers arranged in a single row, and a retainer rotatably supporting the rollers with axial lines of rotation of the rollers offset by 90 degrees in an alternating fashion, or consist of a plurality of balls arranged in a single row, and a retainer rotatably supporting the balls.

To the end of achieving a play free and friction free engagement between the intermediate member and the second shaft, one of mutually opposing end surfaces of the intermediate member and the second shaft may be provided with a cylindrical recess, and the other of the mutually opposing end surfaces of the intermediate member and the second shaft may be provided with a stub shaft rotatably received in the recess, a common axial center line of the stub shaft and the recess being offset from the axial center line of the second shaft. Preferably, the stub shaft is received in the cylindrical recess via a roller bearing so as to minimize friction.

In view of eliminating any play is the steering device, and ensure a highly rigid path of torque transmission, the first shaft may be restricted from making an at least outward axial movement for instance by using angular ball bearings, and an adjust screw may be threadably fitted into the casing with an internal end thereof engaging an outer axial end of the second shaft so as to apply a preset axial load between the first shaft, the intermediate member and the second shaft. By adjusting the adjust screw, it is possible to achieve a desired rigidity in the path of torque transmission and eliminate plays.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
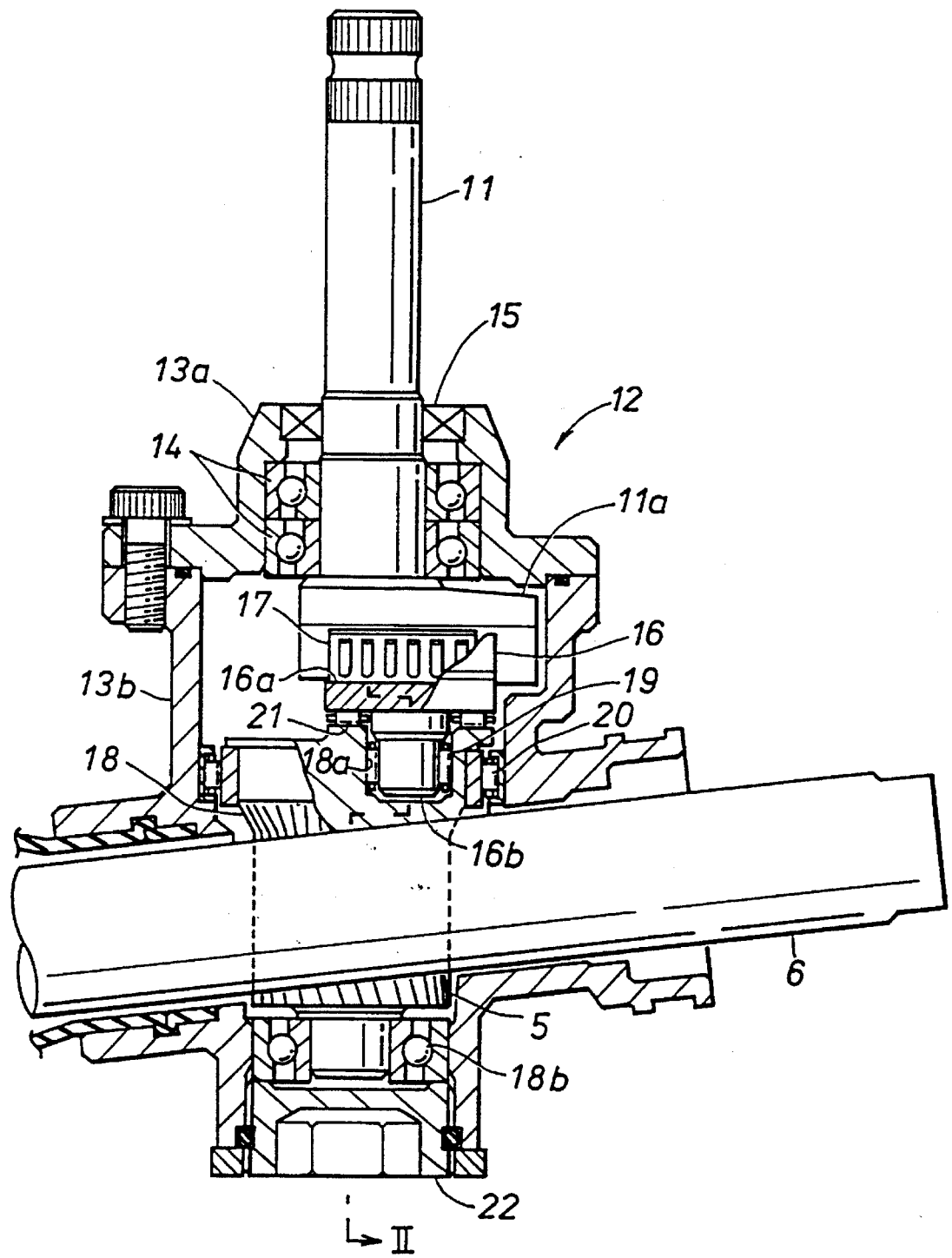
FIG. 1 is a sectional view showing an embodiment of the variable gear ratio steering device according to the present invention.
Figure 2:
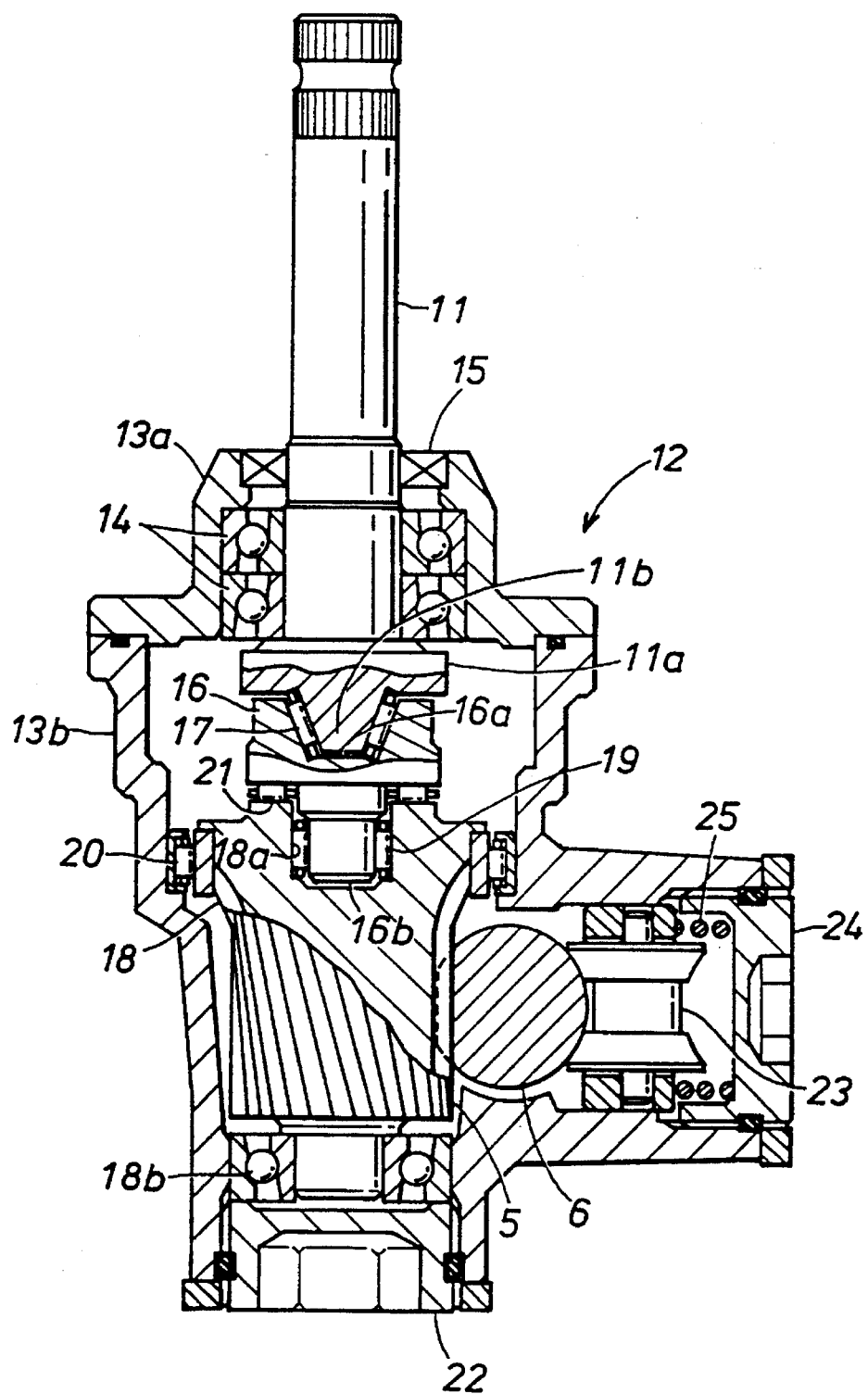
FIG. 2 is a sectional view taken along line II—II of FIG. 1.
Figure 6:
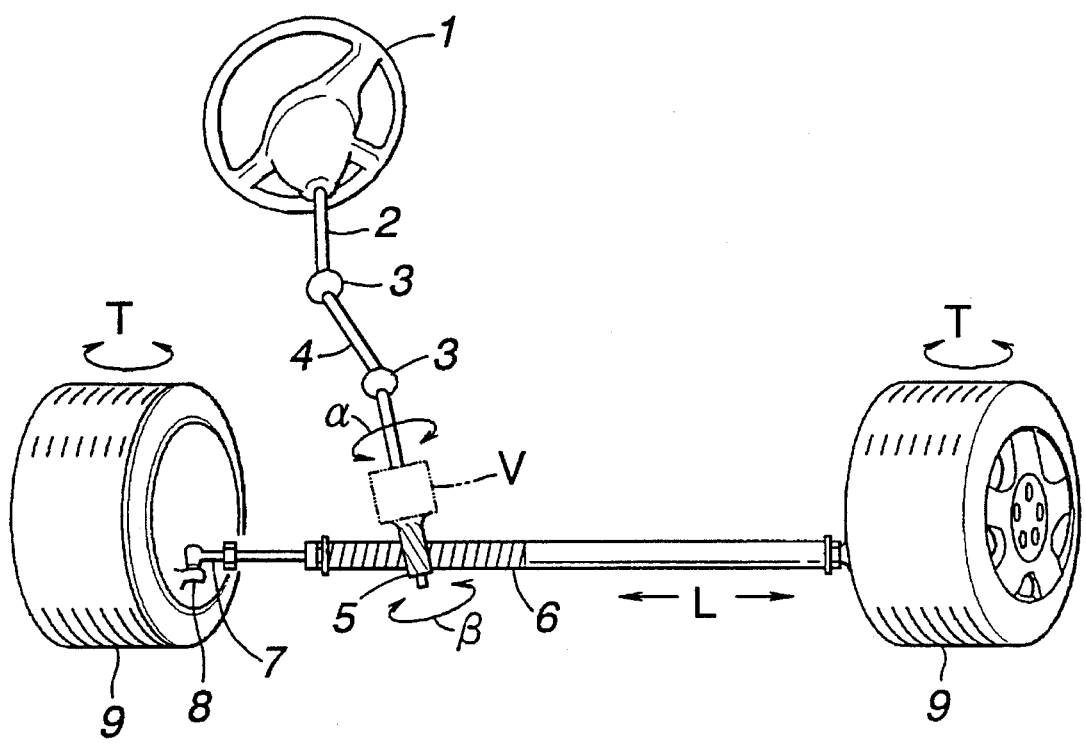
FIG. 6 is a diagram showing the typical vehicle steering system.

FIGS. 1 and 2 show a first embodiment of the variable gear ratio steering device according to the present invention. This device 12 is adapted to be installed in the part of FIG. 6 indicated by symbol "V", and comprises an input shaft 11 connected to the steering wheel 1 of FIG. 6. This input shaft 11 is rotatably supported by a pair of angular ball bearings 14 supported by an upper part of an upper casing 13a of the steering device 12, and is capable of supporting an axial load. A seal member 15 is fitted in an annular gap defined between the input shaft 11 projecting out of the upper casing 13a and a part of the upper casing 13a surrounding the input shaft 11.

An internal axial end of the input shaft 11 received in the upper casing 13a is provided with a radial extension 11a having a ridge 11b having tapered side surfaces on an inner axial end thereof. The tapered ridge 11b is received in a complementary slot 16a of an intermediate member 16 via a pair of flat needle bearings 17 so as to be freely slidable relative to each other along the length of the ridge 11b or the slot 16a extending in the radial direction. Thus, the intermediate member 16 is coupled to the input shaft 11 in a torque transmitting relationship but so as to be freely moveable along a direction perpendicular to the axial direction of the input shaft 11.

The other axial end of the intermediate member 16 facing away from the slot 16a is provided with a stub shaft 16b extending integrally and axially therefrom. An output shaft 18 is rotatably supported in a lower casing 13b by a needle bearing 20 and an angular ball bearing 18b. The output shaft 18 is disposed in parallel with but radially offset relative to the input shaft 11. The end surface of the output shaft 18 opposing the intermediate member 16 is provided with a cylindrical recess 18a which receives the stub shaft 16b via a radial needle bearing 19. A thrust needle bearing 21 is interposed between the parts of the opposing end surfaces of the intermediate member 16 and the output shaft 18 surrounding the stub shaft 16b. This stub shaft 16b extends parallel to the input shaft 11 but the common axial center line of the stub shaft 16b and the cylindrical recess 18a is eccentrically offset from the input shaft 11 and the output shaft 18.

Thus, the stub shaft 16b is rotatably received in the cylindrical recess 18a of the output shaft 18, and torque can be transmitted from the input shaft 11 to the output shaft 18 via a point of engagement offset from either the axial center line of the input shaft 11 or the axial center line of the output shaft 18. It should be noted that the axial center line of the input shaft 11 is offset from the axial center of the output shaft 18 to the end of achieving a nonlinear relationship between the input shaft 11 and the output shaft 18. This relationship can be achieved in a number of different ways, but this particular embodiment is advantageous because the lateral expanse of the intermediate member 16 and the overall axial length can be minimized. The angular ball bearing 18b is capable of supporting a downward axial force applied by the output shaft 18.

The output shaft 18 is formed with a helical pinion 5 in a main part thereof located between the two bearings 20 and 18b. And this pinion 5 meshes with a rack 6 formed on a rack shaft connected to the steerable road wheels to convert the rotational movement of the steering wheel 1 to the linear movement of the rack shaft.

An adjust screw 22 is threadably fitted into a lower end of the lower casing 13b, and the inner end of this adjust screw 22 engages the lower end of the outer race of the angular ball bearing 18b supporting the lower end of the output shaft 18 so that, by appropriately turning the adjust screw 22, the pinion 5 is moved axially and a desired preload can be applied between the input shaft 11 and the output shaft 18 with the intermediate member 16 interposed therebetween. Thus, simply by adjusting the adjust screw 22, it is possible to remove any play which the intermediate member 16 may have, and the backlash of the overall system can be controlled. Furthermore, by adjusting the magnitude of the preload, the rigidity of the torque transmitting train of the system can be controlled, and a desired operating impression on the rigidity of the system can be achieved.

As best shown in FIG. 2, a pressure roller 23 rotatably supported by a carder abuts the rear surface of the rack 6, and the carder along with the pressure roller 23 is resiliently urged toward the rack 6 by a compression coil spring 25 interposed between the carder of the pressure roller 23 and an adjust screw 24 threadably fitted into the lower casing 13b so as to guide the linear movement of the rack 6 along its axial direction substantially without any play.

Now the operating principle of this embodiment is described in the following with reference to FIG. 3.

Figure 3:
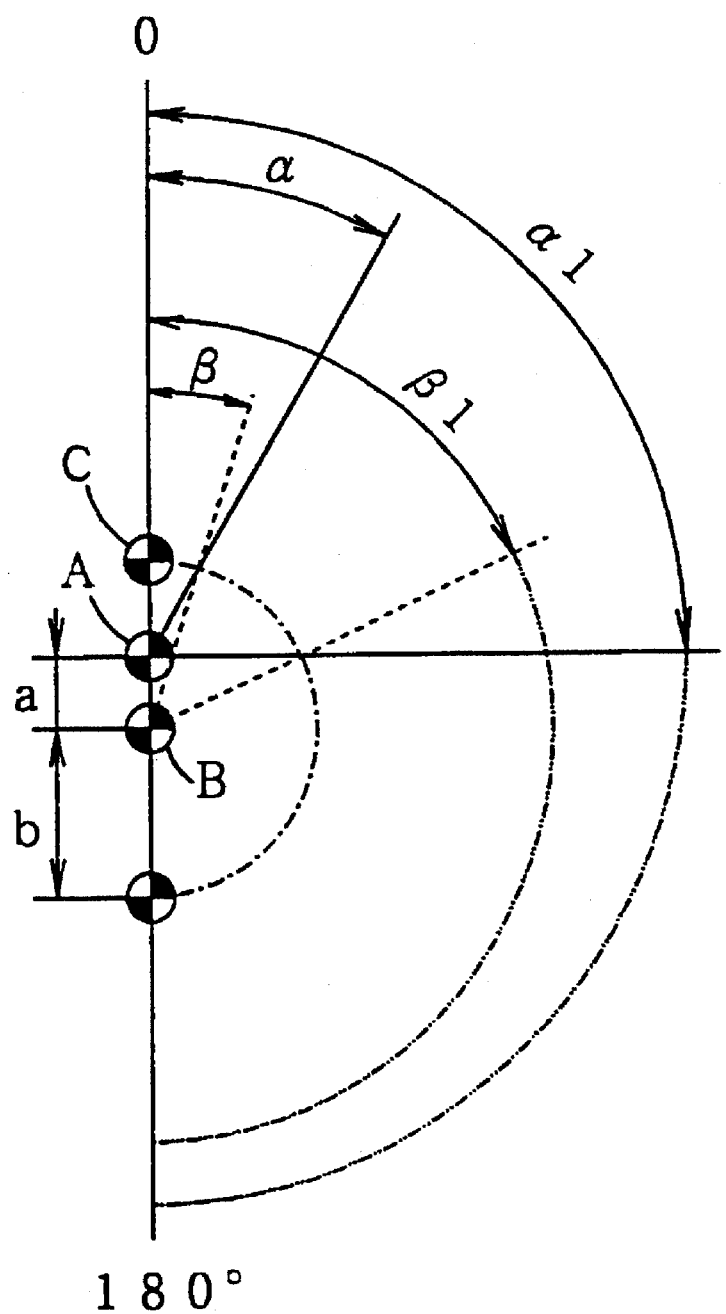
FIG. 3 is a diagram for illustrating the working principle of the present invention.

In the diagram of FIG. 3, A and B denote the rotational centers of the input shaft 11 and the output shaft 18, C denotes the point of engagement between the intermediate member 16 and the output shaft 18 or the axial center of the stub shaft 16, a denotes the amount of eccentricity between the input shaft 11 and the output shaft 18 or the distance between A and B, b denotes the distance between B and C, α denotes the rotational angle of the input shaft 11 or the steering angle of the steering wheel 1, and 13 denotes the rotational angle of the output shaft 18 or the rotational angle of the pinion 5. According to the geometric relationship between the various parts, the following mathematical relationship holds:

$$b \sin\beta = (B \cos\beta - a)\tan\alpha$$

This can be also written as given in the following:

$$\alpha = \tan^{-1}\{b \sin\beta/(B \cos\beta - a)\}$$

Figure 7:
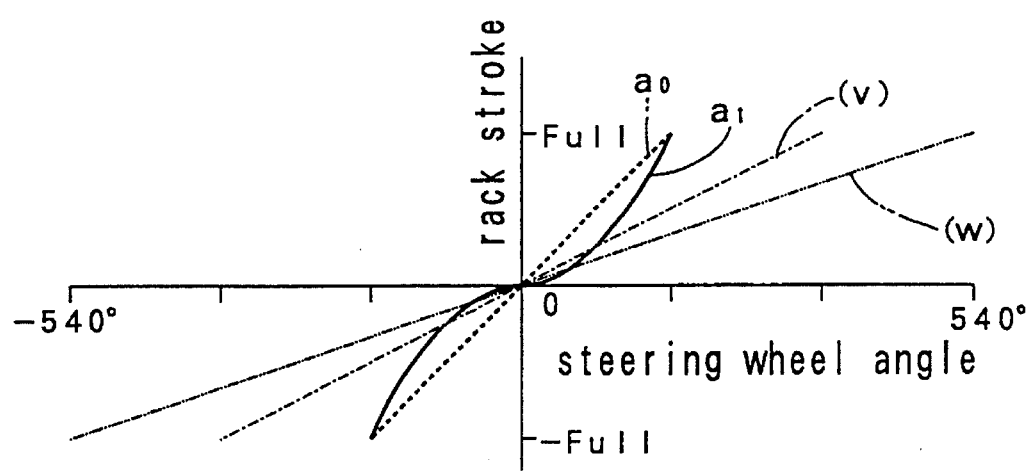
FIG. 7 is a graph showing the relationship between the steering input angle and the displacement of a rack.

When the input shaft 11 is turned, the intermediate member 16 turns in the manner of a crank around the axial center A of the input shaft 11 by virtue of the engagement therebetween via the slide bearings 17, and the stub shaft 16b of the intermediate member 16 turns the output shaft 18 around its axial center B by virtue of the engagement between the stub shaft 16b and the cylindrical recess 18a. Because of the presence of eccentricity a between the input shaft 11 and the output shaft 18, the rotational angle of the output shaft 18 is not generally proportional to the rotational angle of the input shaft 11. More specifically, as indicated by the solid line $a_1$ given in FIG. 7, the change in the angle of the output shaft 18 for a given increment of the rotational angle of the input shaft 11 progressively increases as the rotational angle of the input shaft 11 increases.

Figure 8:
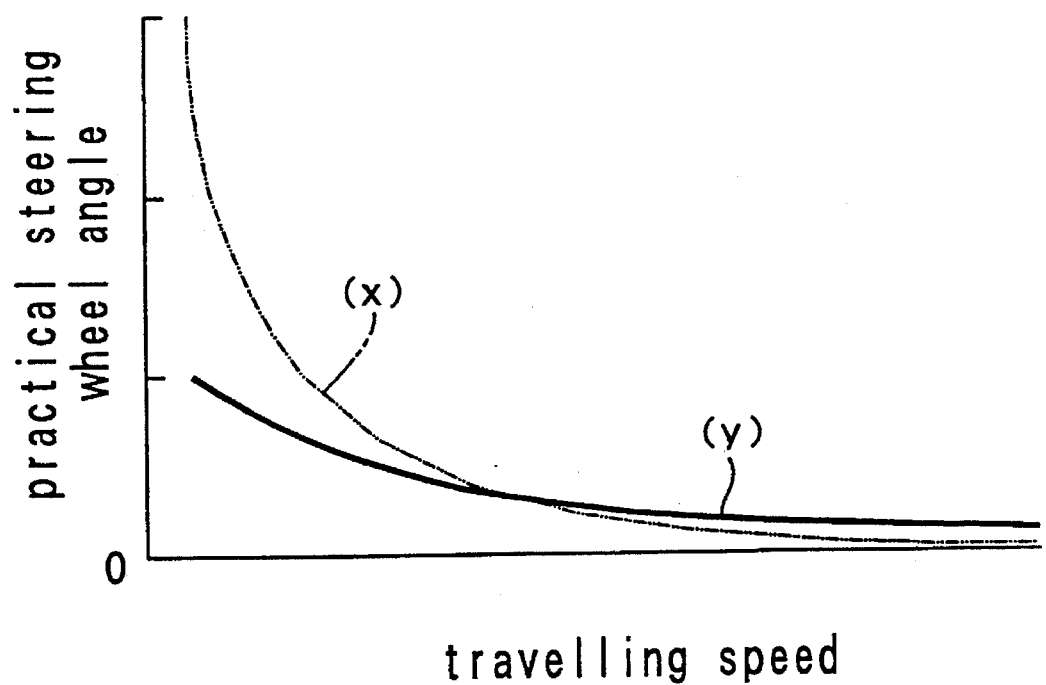
FIG. 8 is a graph showing the relationship between the traveling speed of the vehicle and the typical steering angle.

Furthermore, by changing the amount of eccentricity a, for instance for different car models, it is possible to change the ratio of the rotational angle of the output shaft 18 for a given rotational angle of the input shaft 11 or the effective steering angle ratio as desired. As a special case, if there is no eccentricity between the input shaft 11 and the output shaft 18, the steering angle ratio is constant or the steering angle of the output shaft 18 changes in proportion to the rotational angle of the input shaft 11 as indicated by the broken line $a_0$ in FIG. 7. According to the present invention, however, a certain eccentricity is generally present between the input shaft 11 and the output shaft 18, and the effective gear ratio progressively increases as the steering wheel steering angle increases as indicated by the solid line $a_1$ given in FIG. 7. This means that the effective steering gear ratio is small in a small steering angle range, and the vehicle operator experiences a relatively stable steering response. On the other hand, in a large steering angle range, the effective steering gear ratio is higher, and the vehicle operator experiences a relative brisk steering response. Because the steering angle is relatively small in a high speed range of vehicle operation, and large steering angles occur only in a low speed range, the practical or typical steering angle would be as indicated by (x) in FIG. 8 in the case of a conventional fixed steering ratio steering system, and as indicated by (y) in FIG. 8 in the case of the variable gear ratio steering system according to the present invention. Thus, according to the present invention, stability in the handling of the vehicle response in a high speed range, and favorable maneuverability in a low speed range can be achieved at the same time.

According to this embodiment, the parts such as the input shaft 11, the intermediate member 16 and the output shaft 18 directly involved in the transmission of torque are rotatably supported by bearings, typically consisting of rolling bearings such as ball bearings, roller bearings and needle bearings, and it is easier to achieve a necessary precision as compared to the conventional system using elliptic gear mechanisms. Furthermore, because the contact area at each point of engagement in the torque transmitting train of the system is relatively large, a highly durable structure can be achieved, and the system can be operated without producing any substantial noises. Also, the variation of the steering angle ratio can be carried out at will, and the steering input also can be changed continuously without creating any unusual impression.

Figure 4:
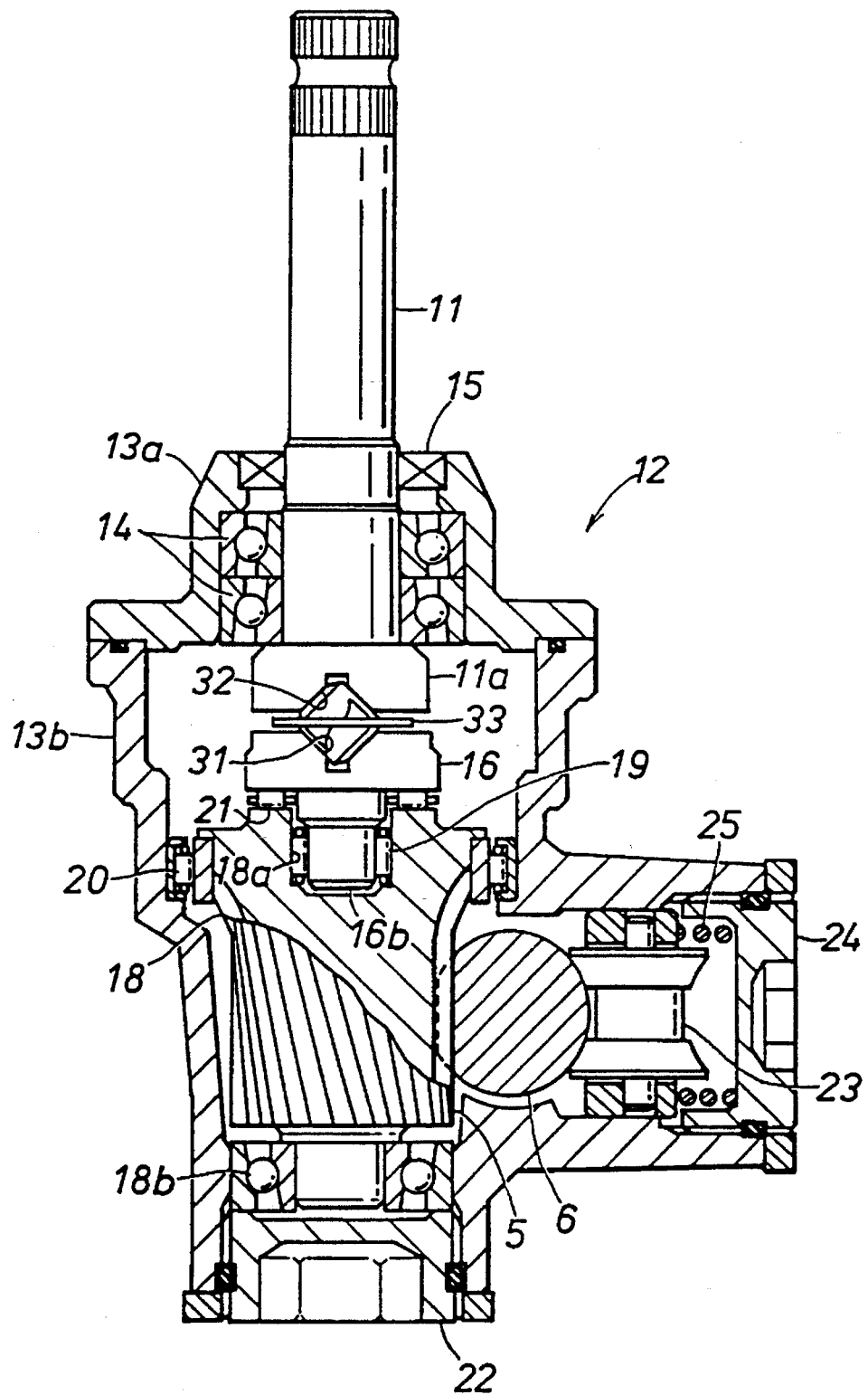
FIG. 4 is a view similar to FIG. 2 showing a second embodiment of the present invention.

Now a second embodiment of the present invention is described in the following with reference to FIG. 4. In FIG. 4, the parts corresponding to those of the previous embodiment are denoted with like numerals.

In this embodiment, the upper end of the intermediate member 16 is provided with a V-shaped groove 31 having a 90 degree opening angle, instead of a slot 16a having tapered side walls, and the opposing end surface of the radial extension 11a of the input shaft 11 is provided with a similar V-shaped groove 32 having a 90 degree opening angle. These grooves 31 and 32 are aligned with each other, and define an elongated cavity having a rectangular cross section. In this cavity is received a slide bearing 33 consisting of a plurality of rollers rotatably supported by a retainer in a single row so as have their axes of rotation offset by 90 degrees in an alternating fashion. Thus, the intermediate member 16 and the input shaft 11 can freely move along the length of the grooves 31 and 32 relative to each other with the aid of the slide bearing 33. This embodiment has the advantage of simplicity.

Figure 5:
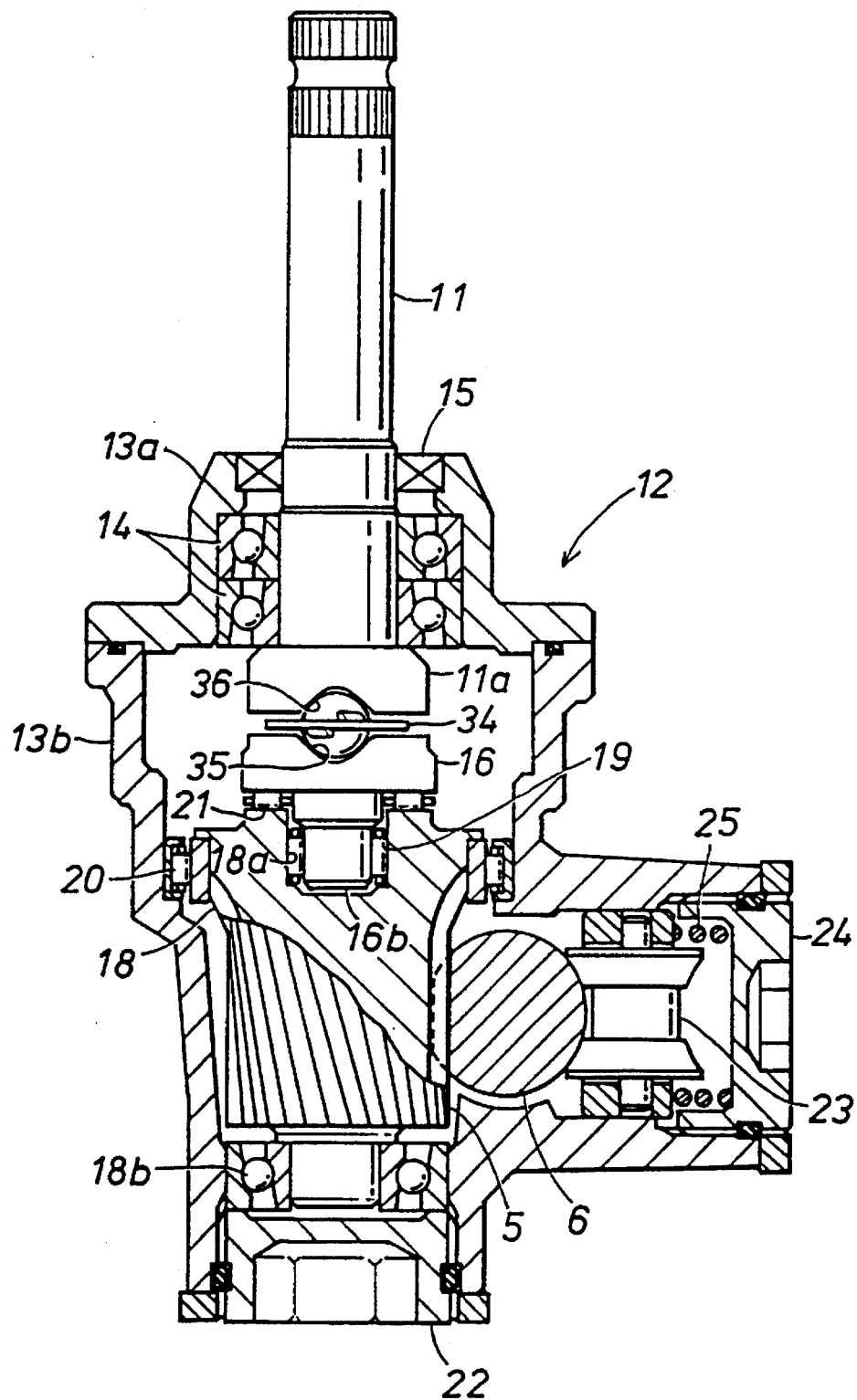
FIG. 5 is a view similar to FIG. 2 showing a third embodiment of the present invention.

Now a third embodiment of the present invention is described in the following with reference to FIG. 5. In FIG. 5, the parts corresponding to those of the previous embodiments are denoted with like numerals.

This embodiment is similar to the second embodiment, but the slide bearing 34 consist of a single row of steel balls rotatably supported by a retainer, and is received in a pair of mutually aligned grooves 31 and 32 having somewhat arcuate side walls and provided in the opposing end surfaces of the radial extension 11a of the input shaft 11 and the intermediate member 16. This embodiment provides similar advantages as those of the second embodiment.

In the above described embodiments, the pinion 5 was provided on the output shaft 18 while the steering wheel 1 was connected to the input shaft 1. However, it is also possible to reverse this relationship. More specifically, it is possible to exchange the functions of the input shaft 11 and the output shaft 18, and provide a pinion on the thus newly defined output shaft while the steering wheel is connected to the thus newly defined input shaft.

Thus, according to the present invention, it is possible to create a nonlinear relationship between the input shaft and the output shaft by using a purely mechanical power transmission mechanism, and to thereby achieve a stable handling of the vehicle in a high speed range and a brisk maneuverability in a high speed range with a highly simple structure. As this nonlinear relationship can be adjusted by varying the eccentricity between the input shaft and the output shaft at will, it is possible to obtain optimum steering ratio characteristics for each different vehicle model in a simple manner. By using roller bearings in the part of sliding engagement between the input shaft and the intermediate member, a smooth and favorable operating impression can be achieved, and the durability of the sliding parts can be increased with the added advantage of reduced noises.

Although the present invention has been described in terms of specific embodiments, it is possible to modify and alter details thereof without departing from the spirit of the present invention.

What I claim is:

1. A variable gear ratio steering device for a motor vehicle, comprising: a housing;

a first shaft supported by said housing so as to be rotatable around an axial center line of said first shaft, said first shaft having an inner axial end;

a second shaft supported by said housing so as to be rotatable around an axial center line of said second shaft which extends in parallel with the axial center line of said first shaft but offset from said axial center line of said first shaft, said second shaft having an inner axial end opposing said axial inner end of said first shaft; and an intermediate member engaged with said inner axial end of said first shaft so as to be integrally rotatable but slidable along a radial direction, and engaged with said axial inner end of said second shaft at a point offset from an axial center line of said second shaft in a torque transmitting relationship;

one of said first and second shafts being functionally connected to a steering wheel while the other of said first and second shafts is functionally connected to a steerable road wheel.

2. A variable gear ratio steering device according to claim 1, wherein one of said opposing axial ends of said first shaft and said intermediate member is provided with a ridge, and the other of said opposing axial ends of said first shaft and said intermediate member is provided with a complementary slot for receiving said ridge, a pair of slide bearings being interposed between opposing side walls of said ridge and said slot.

3. A variable gear ratio steering device according to claim 1, wherein said opposing axial ends of said first shaft and said intermediate member are provided with mutually opposing radial grooves, and a slide bearing is received in said grooves so as to allow transmission of torque between said first shaft and said intermediate member while allowing free linear movement along a radial direction.

4. A variable gear ratio steering device according to claim 3, wherein said slide bearing includes a plurality of rollers arranged in a single row, and a retainer rotatably supporting said rollers with axial lines of rotation of said rollers offset by 90 degrees in an alternating fashion.

5. A variable gear ratio steering device according to claim 3, wherein said slide bearing includes a plurality of balls arranged in a single row, and a retainer rotatably supporting said balls.

6. A variable gear ratio steering device according to claim 1, wherein one of mutually opposing end surfaces of said intermediate member and said second shaft is provided with a cylindrical recess, and the other of said mutually opposing end surfaces of said intermediate member and said second shaft is provided with a stub shaft rotatably received in said recess, a common axial center line of said stub shaft and said recess being offset from said axial center line of said second shaft.

7. A variable gear ratio steering device according to claim 1, wherein said first shaft is restricted from making an at least outward axial movement, and an adjust screw is threadably fitted into said casing with an internal end thereof engaging an outer axial end of said second shaft so as to apply a preset axial load between said first shaft, said intermediate member and said second shaft.

* * * * *